United States Patent [19]

Knopp et al.

[11] 3,930,998
[45] Jan. 6, 1976

[54] WASTEWATER TREATMENT

[75] Inventors: Paul V. Knopp, Wausau; Wayne B. Gitchel, Rothschild, both of Wis.

[73] Assignee: Sterling Drug Inc., New York, N.Y.

[22] Filed: Sept. 18, 1974

[21] Appl. No.: 506,977

[52] U.S. Cl. .......................... 210/5; 210/10; 210/16
[51] Int. Cl.² .......................................... C02C 3/00
[58] Field of Search ........................... 210/3–8, 10, 210/11, 12, 14, 15–18, 63, 67, 71

[56] References Cited
UNITED STATES PATENTS

| | | | |
|---|---|---|---|
| 3,359,200 | 12/1967 | Gitchel et al. | 210/10 |
| 3,617,540 | 11/1971 | Bishop et al. | 210/16 |
| 3,697,417 | 10/1972 | Teletzke et al. | 210/10 |
| 3,764,523 | 10/1973 | Stankewich | 210/5 |
| 3,824,185 | 7/1974 | Caldwell et al. | 210/11 |
| 3,849,303 | 11/1974 | Torpey | 210/4 |

FOREIGN PATENTS OR APPLICATIONS

| | | | |
|---|---|---|---|
| 47-4037 | 3/1972 | Japan | 210/16 |

*Primary Examiner*—Thomas G. Wyse
*Attorney, Agent, or Firm*—Thomas L. Johnson; B. Woodrow Wyatt

[57] ABSTRACT

A method for the improvement of the biological removal of nitrogen from wastewater consisting of the partial oxidation of waste activated sludge and other carbonaceous material generating soluble BOD which may be substituted for methanol as an oxygen acceptor in biological denitrification.

8 Claims, 1 Drawing Figure

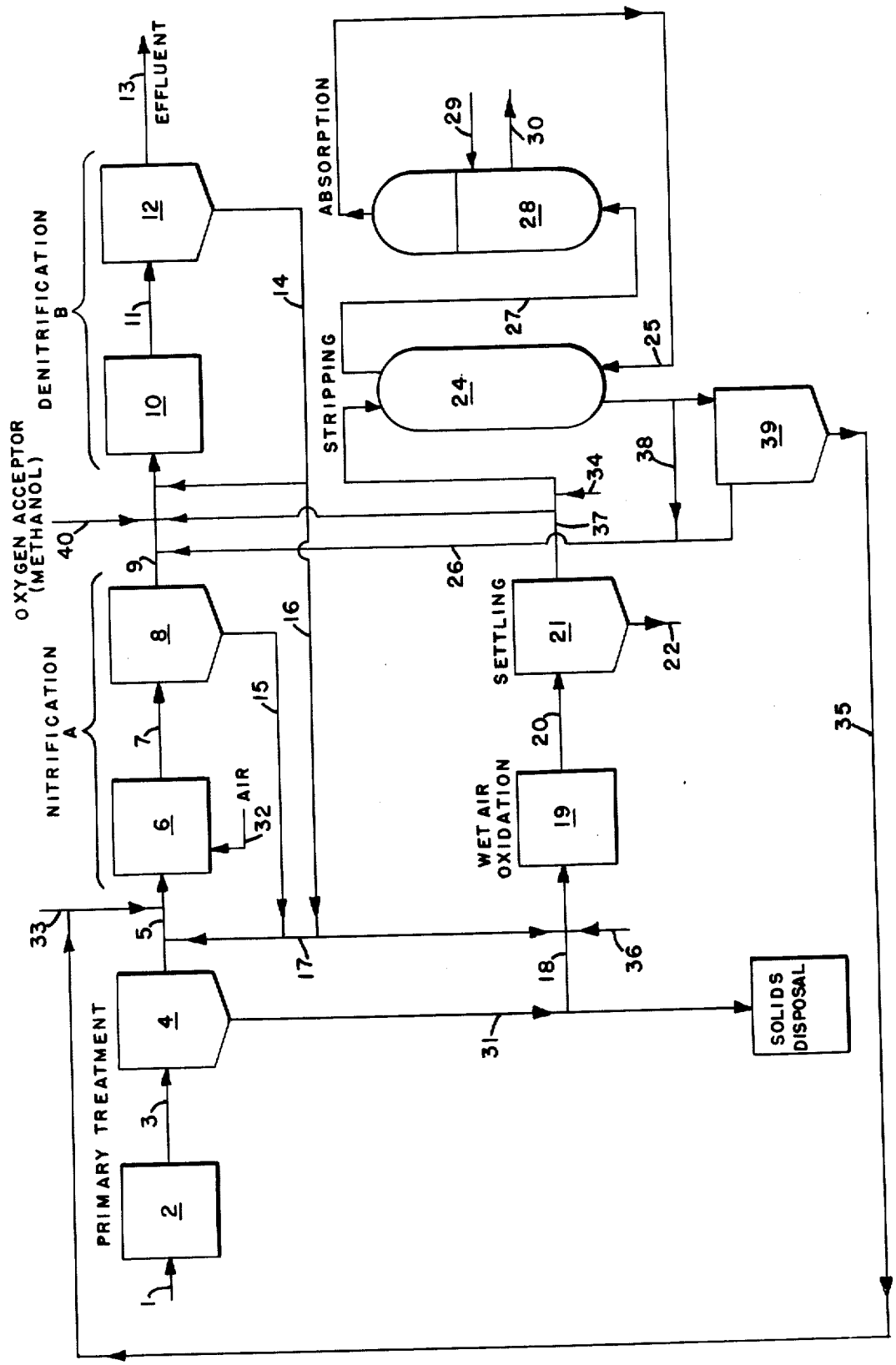

WASTEWATER TREATMENT

This invention relates to the treatment of sewage and other wastewaters to remove organic and inorganic impurities, namely organic carbonaceous materials and organic and inorganic nitrogenous material. More specifically, this invention describes a process for biological oxidation of nitrogenous material followed by reduction of the oxidized nitrogenous material to elemental nitrogen by biological denitrification.

BACKGROUND OF THE INVENTION

Reduced nitrogen contained in wastewater when discharged into receiving streams exerts a long term oxygen demand which consumes the oxygen resource of the receiving water upon biological oxidation. Both reduced and oxidized nitrogen fertilize receiving waters and are often responsible for algal blooms in lakes. Oxidized nitrogen in the nitrate form has been linked to methemoglobinemia (so called blue babies), a serious disease of infants.

Traditional forms of nitrogen removal from wastewater consist of chemical-physical and biological means. In physical-chemical methods the pH of the wastewater is adjusted to in excess of 9.0 and air is passed through the liquid to remove the ammonia nitrogen. Ammonia stripping is a viable process when volumes are small and ammonia concentrations relatively high. However, for application to wastewater the method has the disadvantage of requiring large quantities of stripping gas with poor performance at low temperature.

Alternatively wastewater is passed through an ion exchange bed. Specific ion exchange media for ammonium ion can be used. Such a method has the disadvantage that organic nitrite and nitrate nitrogen are not removed. Large quantities of regenerant are required and adsorption capacity decreases over numerous regeneration cycles requiring replacement of the ion exchange medium.

Ammonia nitrogen can be removed by break point chlorination. This method has the disadvantage of requiring close pH control and chlorine addition significantly increases the dissolved solids in the wastewater.

Nitrate ion can be removed by ion exchange but the selective resins require scarce petro-chemical feed stock for synthesis and in application require large quantities of corrosive regenerants such as hydrochloric acid.

Nitrogen can be effectively removed biologically by first oxidizing the reduced ammonia and organic nitrogen to nitrate nitrogen followed by biological reduction of the oxidized nitrogen to elemental nitrogen which is given off as a gas.

Domestic sewage contains organic and inorganic nitrogenous material as well as carbonaceous material. For example, a typical raw sewage contains approximately 250 mg/l five day biological oxygen demand ($BOD_5$), and 40 mg/l total Kjeldahl nitrogen (TKN) of which approximately 30 mg/l is in the ammoniacal form ($NH_3$ or $NH_4+$). Conventional primary sedimentation will reduce the $BOD_5$ and TKN to about 175 mg/l and 32 mg/l, respectively. Subsequent aerobic biological treatment by, for example, activated sludge under suitable operating conditions oxidizes the ammoniacal nitrogen to nitrite and nitrate nitrogen as well as substantially reducing the $BOD_5$. Subsequent treatment in a stage containing heterotrophic bacteria where no oxygen is added anaerobic conditions) (anaerobic sufficient organic carbon is present results in reduction of nitrate nitrogen to elemental nitrogen which is given off in gaseous form.

Organisms responsible for oxidation of carbonaceous organic material are ubiquitous and are generally considered to be largely heterotrophic organisms such as zooglea, pseudomonas and chromobacterium which require organic carbon as a food and energy source. Organisms responsible for nitrification are classed as chemotrophic because of their ability to fix inorganic carbon ($CO_2$) as their carbon source. Nitrosomonas and nitrobacter are representative of the group responsible for nitrification. Denitrification is accomplished by facultative organisms capable of utilizing the oxygen in the nitrate form. Schematically the various transformations are represented as follows:

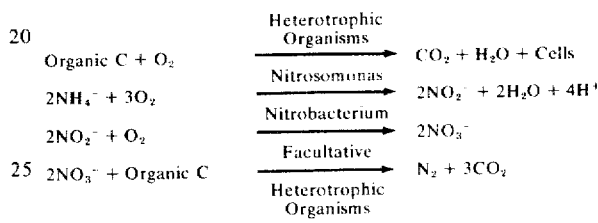

In conventional biological nitrification and denitrification systems the growth rate of the organisms responsible for nitrification is much slower than the heterotropic organisms. Thus long cell residence times are required to maintain a viable nitrifying mass in order to prevent washing out of nitrifiers either in the effluent or in the wasted sludge. The nitrification rate is strongly dependent upon pH, the optimum value lying between 7.5 and 8.5. Oftentimes it is necessary to add alkalinity to sewages deficient in alkalinity in order to maintain the pH in the optimum region for growth of nitrifiers. The principles governing the above phenomenon are described in a paper by Downing et al. (J. Inst. Sew. Purif., 1961, p. 130).

Denitrification is not only dependent upon the mass of denitrifying organisms present in the system, but also on the availability of organic carbon to provide energy and to act as electron donor or oxygen acceptor in the denitrification step. In practice the denitrification rate is accelerated by providing an organic carbon source, such as methanol, to maintain the denitrification rate at a high level.

Accordingly, it is the object of this invention to provide a method for simultaneously removing organic carbonaceous material and nitrogenous material from sewage under improved conditions so as to accelerate the rate of removal of nitrogen.

A further objective of the invention is to accelerate the rate of denitrification by providing improved conditions for increasing the denitrification rate in the denitrification step.

It is the purpose of this invention to provide a suitable oxygen acceptor which may be substituted for acetate, methanol or other commercial organic biodegradeable material used as an oxygen acceptor. It is a further purpose of this invention to provide for removal and recovery of a portion of the nitrogen for a fertilizer. A still further purpose is to provide suitable alkalinity for maintaining the pH of the nitrifying step. It is still a further purpose of this invention to provide an economical means of sludge disposal while at the same time providing the advantages listed above.

DESCRIPTION OF THE INVENTION

The invention is an improvement in the process of nitrogen removal from wastewater by a. mixing wastewater containing reduced nitrogenous compounds with active nitrifying organisms and an oxygen-containing gas for a sufficient length of time to convert substantially all of the nitrogenous material to the nitrate form;

b. separating said nitrifying organisms and the accumulated biomass from the nitrified wastewater stream, recycling the separated nitrifying organisms and accumulated biomass to the nitrification contacting step, and periodically or continuously removing a portion of the accumulated biomass from the nitrifying step;

c. contacting said nitrified wastewater stream with heterotrophic denitrifying bacteria for a length of time sufficient to reduce the nitrate nitrogen to elemental nitrogen; and d. separating said denitrifying organisms and the accumulated biomass from the denitrified wastewater stream, recycling the separated denitrifying organisms and accumulated biomass to the denitrification step, and periodically or continuously removing a portion of the accumulated biomass from the denitrifying step. Said improvement comprises heating the biomass removed from the nitrifying and denitrifying steps in the presence of an oxygen-containing gas at a temperature of 175°C. to 315°C. at an oxygen partial pressure of 5 to 250 psi to partially oxidize the biomass and convert substantially all of the organic nitrogen to ammonia nitrogen, separating the solid phase from the liquid phase of the oxidized mixture, stripping ammonia from the liquid phase and directing said liquid phase to the denitrifying contact step to provide a source of organic carbon for the denitrifying organisms.

As a further aspect of the invention, the biomass removed from the nitrification and denitrification stages, prior to its partial oxidation, can be mixed with primary sludge from the sedimentation of raw sewage or with any other finely ground waste material, preferably having a low nitrogen content, in which the carbon to nitrogen ratio is at least about 20:1.

The present invention thus provides the distinct economic advantage of achieving disposal of excess biomass and other waste materials while at the same time providing an energy source for the denitrification step.

Referring to FIG. I, raw wastewater 1 is subjectd to preliminary treatment such as screening and grit removal 2. The waste stream 3 is treated in an optional primary treatment step 4 consisting of plain settling. The primary effluent 5 or raw sewage is contacted with activated sludge in an aerobic contact tank 6 for a sufficient period of time to sustain the growth of nitrifying bacteria and conversion of nitrogen compounds to nitrate nitrogen. Air 32 or other oxygen containing gas is added to the contact tank to provide mixing and to maintain aerobic conditions. In some cases lime, soda ash or caustic 33 is added to maintain sufficient alkalinity to neutralize the acid formed upon oxidation of the nitrogen and to maintain the pH of the system at optimal pH for growth of nitrifying bacteria. The nitrifying bacteria and accumulated biomass 7 are separated from the waste stream in a settling tank 8 the underflow 15 from which is recycled to the contact basin 6. The nitrified effluent 9 is contacted in a basin 10 containing heterotrophic denitrifying bacteria in which the oxidized nitrogen is reduced to elemental nitrogen and is stripped off of the waste flow. A suitable oxygen acceptor 40, e.g. methanol, is added to the stream to increase the rate of denitrification. The denitrifying bacteria and accumulated biomass 11 are separated from the denitrified wastewater in a settling tank 12 and recycled 14 to the denitrifying contactor. The overflow 13 is treated in subsequent treatment steps such as sand-filtration and disinfection. Alternatively, the nitrified wastewater 9 may be passed through a fixed bed reactor containing attached growth on a suitable medium such as gravel, sand, rock, plastic or wood. Whether fixed or suspended growth medium is employed the principles disclosed herein are equally applicable. A portion of the accumulated biological solids from the nitrification (A) and denitrification (B) steps is removed from the process 16 and 17 where it is optionally combined 18 with primary sludge 31 and oxidized in a wet air oxidation unit 19 in order to simultaneously destroy sludge solids and produce soluble BOD and to convert organic nitrogen to ammonia nitrogen. Other waste organic material 36 after suitable preparation can be mixed or separately fed to the oxidation unit for partial oxidation and solubilization. Suitable material would be any organic material having a high carbon to nitrogen ratio such as ordinary domestic refuse or newsprint. The carbon to nitrogen ratio is preferably at least about 20:1 and desirably as high as 100:1. The solids contained in the oxidized sludge are subsequently separated in a settling tank 21. The underflow solids 22 are disposed of by conventional dewatering means and the overflow 37 can be returned to the denitrification step (B) replacing or diminishing the quantity of methanol required. Where improvement in the BOD to nitrogen ratio is required the partially oxidized supernatant 37 is passed through an ammonia stripper 24 or other suitable ammonia removal device. In the case of ammonia stripping with a non condensible gas, the gas phase, rich in ammonia 27 is passed to an ammonia absorber 28. A typical absorber would consist of passing the gas 27 through a solution of sulfuric acid 29 to form ammonium sulfate 30 for use as a fertilizer. Lime, or other caustic material 34, e.g. sodium hydroxide, is added to the partially oxidized stream 37 to raise the pH to at least about 9.5 to improve the efficacy of ammonia stripping in the stripping column 24. The gas phase from the absorber 25 can be disposed of to the atmosphere or recycled to the stripper to preserve heat. The stripper may be operated under reduced pressure to improve stripping efficiency. The supernatant liquor stripped of ammonia 38 can be recycled to the denitrifying step (B) or can be treated in a settling tank 39 to remove excess lime (a mixture of calcium carbonate and calcium hydroxide) contained in the stripper 24 discharge. The underflow 35 containing excess lime can be returned to the inlet of the nitrification step (A) replacing or reducing the requirements for the addition of alkalinity 33 to the nitrification step.

Alternative flow sheets are possible and will be obvious to one skilled in the art. For example, an aerobic biological treatment step to remove carbonaceous BOD in the wastewater can be inserted ahead of the nitrification step thereby reducing the oxygen demand of the nitrification step and improving the control of the nitrification/denitrification steps. This is the so called three stage nitrification/denitrification system.

The following examples will serve to illustrate the application and utility of the system described.

EXAMPLE I

The following example illustrates the conversion of nitrogen in sludge from organic nitrogen to ammonia nitrogen by partial wet air oxidation making it possible to remove the nitrogen thereby improving the BOD:N ratio of the supernatant liquor and making it suitable for a methanol substitute in the denitrification step.

Samples of raw sewage sludge were oxidized under varying conditions (175°C. to 250°C.) ranging from 13.8% to 81.4% oxidation. After oxidation the distribution of nitrogen as total and soluble Kjeldahl and ammonia nitrogen was determined. These results are summarized in the following table:

NITROGEN DISTRIBUTION IN PARTIALLY OXIDIZED SLUDGE LIQUORS, g/l

| % Oxidation | TOTAL Kjeldahl-N | $NH_4^+$-N | SOLUBLE Kjeldahl-N | $NH_4^+$-N | Soluble $BOD_5$ |
|---|---|---|---|---|---|
| 13.8 | 1.15 | 0.62 | 1.04 | 0.59 | 11.900 |
| 35.6 | 1.14 | 0.83 | 1.00 | 0.77 | 10.240 |
| 66.1 | 1.07 | 0.88 | 0.98 | 0.84 | 7.200 |
| 81.4 | 1.09 | 1.05 | 1.02 | 0.99 | 6.150 |

As the level of oxidation is increased the fraction of soluble nitrogen as ammonia nitrogen is increased. Stripping of the soluble ammonia nitrogen from the total oxidized liquor results in the following BOD:N ratios:

| % Oxidation | g/l Total Nitrogen Remaining After Stripping | Soluble BOD g/l | BOD:N Ratio |
|---|---|---|---|
| 13.8 | .56 | 11.90 | 21.20 |
| 35.6 | .37 | 10.24 | 27.70 |
| 66.1 | .23 | 7.20 | 31.30 |
| 81.4 | .10 | 6.15 | 61.5 |

A $BOD_5$:N ratio of approximately 20:1 would not significantly increase the leak through of ammonia or organic nitrogen to the effluent.

Removing the insoluble nitrogen from the supernatant liquor followed by ammonia stripping substantially increases the BOD:N ratio in the liquor as indicated in the following table:

| % Oxidation | Nitrogen Remaining After Stripping g/l | Soluble BOD g/l | BOD:N Ratio |
|---|---|---|---|
| 13.8 | .45 | 11.90 | 26.4 |
| 35.6 | .23 | 10.24 | 44.5 |
| 66.1 | .14 | 7.20 | 51.5 |
| 81.4 | .03 | 6.15 | 205 |

Thus oxidation, solids removal and stripping greatly improve the BOD:N ratio making the supernatant ideally suited as a substitute for methanol in the denitrification step.

EXAMPLE II

The following example illustrates how cellulosic material may be processed to produce soluble BOD and improve the BOD:N ratio of processed sludge by adding the cellulosic material to the sludge prior to oxidation or by oxidizing it separately to produce a methanol substitute:

| 40 g/l chromatographic cellulose | Oxidation Conditions Temp. °C. | Time, min. | Oxidation of Cellulose % Oxidation | BOD, g/l |
|---|---|---|---|---|
| | 240 | 0 | 7.1 | 2.78 |
| | 230 | 30 | 46.5 | 3.18 |
| | 240 | 30 | 74.3 | 7.06 |

Since the cellulose contains little or no nitrogen the liquor makes an ideal substitute for methanol.

EXAMPLE III

The following example demonstrates how partially oxidized sludge can be stripped of ammonia nitrogen thereby improving the BOD:N ratio of the resulting liquor and making it suitable for use as a substitute for methanol in the denitrification step.

Settled supernatant from a partially oxidized mixed primary and activated sludge (15.9% oxidation at 175°C. and 300 psig) was treated with 8.0 g/l $Ca(OH)_2$ to adjust its pH to 12.0. The sample was aerated at room temperature for several hours resulting in the following:

| Time Hrs. | Total Nitrogen, g/l | $NH_3$-N, g/l | $BOD_5$, g/l | BOD:N |
|---|---|---|---|---|
| 0 | 0.83 | 0.47 | 4.53 | 5.45 |
| 1 | 0.46 | 0.15 | 4.53 | 9.85 |
| 2 | 0.43 | 0.05 | 4.53 | 10.50 |
| 3 | 0.45 | 0.05 | 4.53 | 10.01 |
| 4 | 0.49 | 0.04 | 4.53 | 9.25 |
| 5 | 0.50 | 0.04 | 4.53 | 9.05 |

Thus the BOD:N ratio is improved from 5.45 to 9.05 by stripping the ammonia nitrogen from the liquor. The slurry after treatment had a pH of 12.0 and contained excess lime. This lime can be recycled to the nitrification step to provide alkalinity when needed. In the above treated sample the slurry after ammonia stripping was settled resulting in a slurry containing 3.77 grams per liter of precipitated calcium carbonate and calcium hydroxide.

EXAMPLE IV

This example serves to illustrate how partially oxidized supernatant can be used in a nitrification/denitrification system as a suitable oxygen acceptor. A laboratory pilot plant biological nitrification/denitrification system was operated on primary effluent sewage from a municipality. Initial operation of the system utilized methanol as a hydrogen donor (oxygen acceptor) in the denitrification stip. After denitrification was established, supernatant from partially oxidized sludge was substituted for methanol with little or no change in the denitrification rate. At the end of the experiment the feed of supernatant was stopped and denitrification ceased indicating that the supernatant was a suitable substitute for methanol.

A raw sewage containing approximately 50 mg/l total nitrogen was treated in a two stage biological nitrification/denitrification system. Methanol was added to the denitrification step at the rate of 88 mg/l COD equivalent. Nitrate nitrogen was reduced from 16.9 mg/l to 3.2 mg/l across the denitrification system. Partially oxidized supernatant (derived from mixed primary and waste activated sludge oxidized at 200°C. and 350 psig) from which the ammonia nitrogen had been previously stripped was substituted for the methanol. The resulting reduction in nitrate nitrogen from 15.4 mg/l to 2.4 mg/l was achieved. The following table summarizes the results:

|  | NO₃ In | NO₃ Out |
|---|---|---|
| Methanol at 88 mg/l | 16.9 | 3.2 |
| Methanol at 22 mg/l | 15.4 | 2.4 |
| Supernatant at 88 mg/l | | |
| No methanol or supernatant | 15.8 | 13.5 |

Feed of both methanol and partially oxidized supernatant was ceased and denitrification was reduced. The example illustrates the usefulness of the supernatant as a methanol substitute.

EXAMPLE V

The following example will serve to illustrate how the above principles can be integrated into a conventional waste treatment system. For purposes of illustration it is assumed that 4 million liters of wastewater is to be treated and that preliminary treatment, primary sedimentation, nitrification and denitrification are included in the treatment steps.

Raw sewage is subjected to preliminary treatment consisting of screening and grit removal and passed through primary treatment. The performance is indicated in the following table:

| Item | Raw Sewage mg/l | kg/day | Primary Effluent mg/l | kg/day | Primary g/l | Sludge kg/day |
|---|---|---|---|---|---|---|
| Sus. Solids | 200 | 757 | 100 | 379 | 40.0 | 379 |
| BOD | 250 | 948 | 175 | 662 | — | — |
| TKN | 25.0 | 95 | 21.0 | 79 | 1.68 | 15.9 |
| NH₄⁺ | 15.0 | 57 | 15.0 | 57 | — | 0 |
| NO₃⁻ | 0 | 0 | 0 | 0 | 0 | 0 |

The primary effluent is treated in an activated sludge system in which the solids residence time is sufficient to maintain nitrifying bacteria in the system and to convert essentially all of the ammonia nitrogen in the system to nitrate nitrogen. The following summarizes the performance of the nitrifying system:

| Item | Primary Effluent mg/l | kg/day | Nitrification Effluent mg/l | kg/day | Nitrification Waste Sludge g/l | kg/day |
|---|---|---|---|---|---|---|
| Sus. Solids | 100 | 379 | 10 | 37.6 | 40.0 | 585 |
| BOD | 175 | 662 | 10 | 37.6 | — | — |
| TKN | 21.0 | 79 | 2.0 | 7.6 | 1.61 | 23.6 |
| NH₄⁺-N | 15.0 | 57 | 1.0 | 3.8 | — | — |
| NO₃⁻-N | 0 | 0 | 14.0 | 54.4 | — | — |

In the process of nitrification approximately 54.4 kg/day of nitrate nitrogen is produced. In order to maintain adequate pH in the nitrification step, the addition of alkalinity may be required.

The nitrified effluent is then treated in a biological denitrification step in which the nitrate nitrogen is reduced to elemental nitrogen and stripped off. The following illustrates typical performance of the denitrification step:

| Item | Nitrification Effluent mg/l | kg/day | Denitrification Effluent mg/l | kg/day | Denitrification Waste Sludge g/l | kg/day |
|---|---|---|---|---|---|---|
| Sus. Solids | 10 | 37.6 | 5.0 | 19.1 | 40 | 78.9 |
| BOD | 10 | 37.6 | 5.0 | 19.1 | — | — |
| TKN | 2.0 | 7.6 | 2.0 | 7.6 | 1.5 | 2.9 |
| NH₄⁺ | 1.0 | 3.8 | 1.0 | 3.8 | — | — |
| NO₃⁻ | 14.0 | 54.4 | 0.5 | 1.9 | — | — |

In the denitrification step approximately 53 kg/day of nitrogen is removed by reduction to elemental nitrogen. In conventional systems this will require approximately 2.1 kg of methanol (2.5 kg BOD equivalent) per kilogram of nitrogen for maintenance of nitrogen reduction at an adequate rate or a total methanol requirement of 237 kilograms (290 kg BOD equivalent per day).

The combined sludges can be characterized as follows:

| Item | Primary mg/l | kg/day | Nitrification mg/l | kg/day | Denitrification mg/l | kg/day | Total g/l | kg/day |
|---|---|---|---|---|---|---|---|---|
| Liters/day | 9,250 | | 14,300 | | 1,630 | | 25,200 | |
| Sus. Solids | 40.0 | 379 | 40.0 | 585 | 40.0 | 66.2 | 40.0 | 1031 |
| TKN | 1.68 | 15.9 | 1.61 | 23.6 | 1.5 | 2.9 | 1.65 | 42.4 |

The combined sludge from the system is subjected to partial wet air oxidation at 200°C. and 350 psig, and sedimentation. The characteristics of the supernatant liquor before and after ammonia stripping are as follows:

|  | Before Ammonia Stripping | | After Ammonia Stripping | |
| --- | --- | --- | --- | --- |
| Liters/day | 26,350 | | | |
| Item | g/l | kg/day | g/l | kg/day |
| Soluble BOD₅ | 5.0 | 126 | 5.0 | 126 |
| TKN | 1.59 | 40.1 | .16 | 4.0 |
| NH₄⁺-N | 1.50 | 37.8 | .07 | 1.8 |

The BOD:N ratio of the supernatant is 31.2 making it suitable material for a substitute for methanol in the denitrification step. Clarification of the stripped liquor results in an underflow containing as much as 710 mg/l $CaCO_3$ equivalent in alkalinity which can be used to neutralize the acid formed in nitrification.

In the partial wet air oxidation process the extent of oxidation of the organic substances present can range from about 15 percent to about 95 percent.

We claim:
1. In a process of nitrogen removal from wastewater comprising:
   a. mixing wastewater containing reduced nitrogenous compounds with active nitrifying organisms and an oxygen-containing gas for a sufficient length of time to convert substantially all of the nitrogenous material to the nitrate form and thereby produce a nitrified wastewater stream and accumulated biomass;
   b. separating said nitrifying organisms and accumulated biomass from said nitrified wastewater stream, recycling the separated nitrifying organisms and accumulated biomass to the nitrification contacting step, and periodically or continuously removing a portion of the accumulated biomass from the nitrifying step;
   c. contacting said nitrified wastewater stream with heterotrophic denitrifying organisms and an organic carbon source for a length of time sufficient to reduce the nitrate nitrogen to elemental nitrogen;
   d. separating said denitrifying organisms and accumulated biomass from the denitrified wastewater stream, recycling the separated denitrifying organisms and accumulated biomass to the denitrification step, and periodically or continuously removing a portion of the accumulated biomass from the denitrifying step; and
   e. removing a final effluent with nitrogen removed therefrom; the improvement which comprises heating the biomass removed from the nitrifying and denitrifying steps in the presence of an oxygen-containing gas at a temperature of 175°C. to 315°C. at an oxygen partial pressure of 5 to 250 psi to partially oxidize the biomass and convert substantially all of the organic nitrogen to ammonia nitrogen, separating the resulting oxidized mixture into a solid phase and a liquid phase, removing ammonia from the liquid phase and directing said liquid phase to the denitrifying contact step to provide a source of organic carbon for the denitrifying organisms.

2. A process according to claim 1 in which the biomass to be subjected to partial oxidation is mixed with primary sludge from the sedimentation of raw sewage.

3. A process according to claim 1 in which the biomass to be subjected to partial oxidation is mixed with finely ground waste material having a low nitrogen content thereby obtaining a liquid phase containing a higher carbon to nitrogen ratio than in the liquid phase obtained by oxidizing said biomass alone.

4. A process according to claim 1 which comprises adding an alkaline substance to the liquid phase derived from the partial oxidation of biomass to raise the pH to at least 9.5, stripping ammonia from said liquid phase and directing said liquid phase stripped of ammonia to the denitrifying contact step.

5. A process according to claim 4 in which the ammonia is stripped from the liquid phase by passing a non-condensible gas through the liquid phase, and the non-condensible gas then passed through an ammonia absorption vessel and recirculated through the liquid phase.

6. A process according to claim 4 in which the alkaline material is sodium hydroxide.

7. A process according to claim 4 in which the alkaline material is lime and a residue of a mixture of calcium carbonate and calcium hydroxide is produced.

8. A process according to claim 7 wherein the residue of calcium carbonate and calcium hydroxide is transferred to step (a) of the process of claim 1.

* * * * *

UNITED STATES PATENT OFFICE
CERTIFICATE OF CORRECTION

PATENT NO. : 3,930,998
DATED : January 6, 1976
INVENTOR(S) : Paul V. Knopp and Wayne B. Gitchel It is certified that error appears in the above-identified patent and that said Letters Patent are hereby corrected as shown below:

Column 2, line 1, "anaerobic conditions)(anaerobic"

should read --(anaerobic conditions) and--.

Column 8, table immediately following line 16 should read

| Item | Primary Effluent mg/l | kg/day | Nitrification Effluent mg/l | kg/day | Nitrification Waste Sludge g/l | kg/day |
|---|---|---|---|---|---|---|
| Sus. Solids | 100 | 379 | 10 | 37.6 | 40.0 | 585 |
| BOD | 175 | 662 | 10 | 37.6 | - | - |
| TKN | 21.0 | 79 | 2.0 | 7.6 | 1.61 | 23.6 |
| $NH_4^+$-N | 15.0 | 57 | 1.0 | 3.8 | - | - |
| $NO_3^-$-N | 0 | 0 | 14.0 | 54.4 | - | - |

Signed and Sealed this thirteenth Day of April 1976

[SEAL]

Attest:

RUTH C. MASON
Attesting Officer

C. MARSHALL DANN
Commissioner of Patents and Trademarks